(12) United States Patent
Wang

(10) Patent No.: US 11,533,647 B2
(45) Date of Patent: Dec. 20, 2022

(54) WIRELESS COMMUNICATION METHOD AND WIRELESS COMMUNICATIONS APPARATUS

(71) Applicant: HUAWEI TECHNOLOGIES CO., LTD., Shenzhen (CN)

(72) Inventor: Gang Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 36 days.

(21) Appl. No.: 17/081,961

(22) Filed: Oct. 27, 2020

(65) Prior Publication Data
US 2021/0045005 A1 Feb. 11, 2021

Related U.S. Application Data

(63) Continuation of application No. PCT/CN2019/084380, filed on Apr. 25, 2019.

(30) Foreign Application Priority Data

Apr. 28, 2018 (CN) .......................... 201810402941.6

(51) Int. Cl.
*H04W 28/02* (2009.01)
*H04B 7/0413* (2017.01)
*H04W 28/22* (2009.01)

(52) U.S. Cl.
CPC ...... *H04W 28/0221* (2013.01); *H04B 7/0413* (2013.01); *H04W 28/0284* (2013.01); *H04W 28/0289* (2013.01); *H04W 28/22* (2013.01)

(58) Field of Classification Search
CPC ......... H04W 28/0221; H04W 28/0289; H04W 28/0215; H04W 52/0212; H04W 52/0251;
(Continued)

(56) References Cited

U.S. PATENT DOCUMENTS 9,860,773 B2 * 1/2018 Roessel .................. H04M 3/42
2007/0155413 A1 7/2007 Kerstenbeck
(Continued)

FOREIGN PATENT DOCUMENTS

CN  101192838 A  6/2008
CN  101557644 A  10/2009
(Continued)

OTHER PUBLICATIONS

Huang et al, "Thermal Performance Enhancement With DRX in 5G Millimeter Wave Communication System", IEEE, 2021 (Year: 2021).*

(Continued)

*Primary Examiner* — Omer S Mian
(74) *Attorney, Agent, or Firm* — Rimon PC

(57) ABSTRACT

A wireless communication method and a wireless communications apparatus are provided. Implementation of the method includes: when a first wireless communications apparatus uses a first wireless communication capability to communicate with a second wireless communications apparatus, if the first wireless communications apparatus determines to adjust a wireless communication capability of the first wireless communications apparatus, sending, by the first wireless communications apparatus, first adjustment information to the second wireless communications apparatus, and starting a first timer, where the first adjustment information is used to indicate to adjust the wireless communication capability of the first wireless communications apparatus to a second wireless communication capability. In embodiments of this application, the second wireless communication capability is any one of a plurality of wireless communication capabilities of the first wireless communications apparatus except a maximum wireless communication capability and a minimum wireless communication capability.

17 Claims, 4 Drawing Sheets

(58) Field of Classification Search
CPC ...... H04W 28/22; H04W 88/06; Y02D 30/70; H04B 7/0413
See application file for complete search history.

(56) References Cited

U.S. PATENT DOCUMENTS

| | | | |
|---|---|---|---|
| 2010/0221996 A1 | 9/2010 | Kang et al. | |
| 2013/0039173 A1 | 2/2013 | Ehsan et al. | |
| 2018/0034524 A1* | 2/2018 | Pao | H04L 5/0053 |
| 2020/0221289 A1* | 7/2020 | Lee | H04W 8/24 |
| 2020/0351638 A1* | 11/2020 | Kim | H04W 8/005 |

FOREIGN PATENT DOCUMENTS

| | | |
|---|---|---|
| CN | 102119490 A | 7/2011 |
| CN | 102740281 A | 10/2012 |
| CN | 107493597 A | 12/2017 |
| CN | 107690824 A | 2/2018 |
| CN | 107809773 A | 3/2018 |
| CN | 107820715 A | 3/2018 |
| WO | 2012040510 A1 | 3/2012 |

OTHER PUBLICATIONS

Huawei, Report of email discussion [98#43][LTE/TEI14] UE overheating problem, R2-1708219, 3GPP TSG-RAN WG2 #99, Aug. 21-25, 2017, Berlin, Germany, 16 pages.

3GPP TS 36.331 V15.1.0 (Mar. 2018), 3rd Generation Partnership Project; Technical Specification Group Radio Access Network; Evolved Universal Terrestrial Radio Access (E-UTRA); Radio Resource Control (RRC); Protocol specification (Release 15), Mar. 2018. total 786 pages.

Qualcomm Incorporated,"UE overheating problem", 3GPP TSG-RAN WG2 Meeting #99, R2-1708978, Berlin, Germany, Aug. 21-25, 2017, total 5 pages.

* cited by examiner

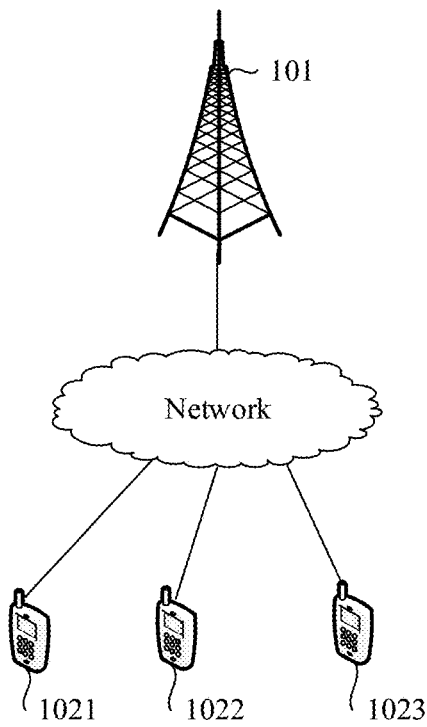

FIG. 1

When a first wireless communications apparatus uses a first wireless communication capability to communicate with a second wireless communications apparatus, if the first wireless communications apparatus determines to adjust a wireless communication capability of the first wireless communications apparatus, the first wireless communications apparatus sends first adjustment information to the second wireless communications apparatus, and starts a first timer, where the first adjustment information is used to indicate to adjust the wireless communication capability of the first wireless communications apparatus to a second wireless communication capability ⟵ 201

Within a specified time of the first timer, the first wireless communications apparatus uses the second wireless communication capability to communicate with the second wireless communications apparatus ⟵ 202

FIG. 2

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2019/084380, filed on Apr. 25, 2019, which claims priority to Chinese Patent Application No. 201810402941.6, filed on Apr. 28, 2018, The disclosures of the aforementioned applications are hereby incorporated by reference in their entireties.

TECHNICAL FIELD

This application relates to the field of wireless communications technologies, and in particular, to a wireless communication method and a wireless communications apparatus.

BACKGROUND

With the continuous development of wireless and wired technologies and the continuous improvement of communication bandwidth, products with bandwidth above 1000 Mbps begin to emerge, creating conditions for more diverse terminal applications. However, due to limitations on sizes and costs of handheld terminals, processing capabilities, power consumption, and heating of terminals have gradually become bottlenecks.

A direct consequence of an increase in power consumption of the terminals is heat dissipation of the device. The device has a suitable temperature range for normal operation. Once a temperature exceeds the range, system stability decreases, or even severe consequences such as device damage may occur. The processing capabilities of the terminals usually can cope with normal service scenarios, but complex service scenarios often cause the terminals to be overloaded. Once a system is overloaded for a long time, scheduling of a software system and stability of the entire system face severe challenges.

In the prior art, service models are usually designed based on empirical values. In extreme scenarios such as a relatively high temperature (overheating) of terminal devices, processor overload, and excessively low power, protection such as packet discarding and restart for the extreme scenarios needs to be performed to avoid a failure of the system to provide normal services. Packet discarding means that when system resources are in a critical state, data that has not been processed is directly discarded. However, because services are not distinguished during packet discarding, quality of service (quality of service, QoS) requirements of different services cannot be met. In addition, packet discarding leads to unpredictable retransmission and a waste of bandwidth resources may be caused. Restart means that once the terminal device is overheated or overloaded for a long time, the system is considered abnormal and restarts directly. In this way, system load can be immediately reset to zero. However, restart may damage robustness of the system, causing poor service experience.

In summary, there are still some disadvantages in the prior art when protection for extreme scenarios is performed. Therefore, at present, there is an urgent need for a communication method that can effectively implement protection for extreme scenarios when the extreme scenarios occur during communication between a terminal device and a network device.

SUMMARY

Embodiments of this application provide a wireless communication method and a wireless communications apparatus, to effectively implement protection for extreme scenarios when the extreme scenarios occur during communication between a terminal device and a network device.

According to a first aspect, an embodiment of this application provides a wireless communication method, where the wireless communication method is applied to a first wireless communications apparatus, the first wireless communications apparatus is configured to have a plurality of wireless communication capabilities, and the method includes:

when the first wireless communications apparatus uses a first wireless communication capability to communicate with a second wireless communications apparatus, if the first wireless communications apparatus determines to adjust the wireless communication capability of the first wireless communications apparatus, sending, by the first wireless communications apparatus, first adjustment information to the second wireless communications apparatus, and starting a first timer, where the first adjustment information is used to indicate to adjust the wireless communication capability of the first wireless communications apparatus to a second wireless communication capability; and within a specified time of the first timer, using, by the first wireless communications apparatus, the second wireless communication capability to communicate with the second wireless communications apparatus, where the first wireless communication capability may be any one of the plurality of wireless communication capabilities.

In this embodiment of this application, the second wireless communication capability is any one of the plurality of wireless communication capabilities except a maximum wireless communication capability and a minimum wireless communication capability. In other words, when the wireless communication capability is adjusted, an adjustment range is relatively small, to effectively avoid technical problems that a communication speed is unstable and user experience is affected due to a relatively large adjustment range. Further, because the first wireless communications apparatus is configured to have a plurality of wireless communication capabilities, after the specified time of the first timer expires, the first wireless communications apparatus can cyclically perform the foregoing steps, thereby gradually adjusting the wireless communication capability of the first wireless communications apparatus and performing protection for extreme scenarios in a smoother manner. In this way, the first wireless communications apparatus can maintain a relatively balanced state during communication, providing a user with a more stable service and improving user experience.

In a possible design, the method further includes:

when the first wireless communications apparatus uses the second wireless communication capability to communicate with the second wireless communications apparatus, if the first wireless communications apparatus determines to adjust the wireless communication capability of the first wireless communications apparatus, sending, by the first wireless communications apparatus, second adjustment information to the second wireless communications apparatus, and starting a second timer, where the second adjustment information is used to indicate to adjust the wireless communication capability of the first wireless communications apparatus to a third wireless communication capability; and within a specified time of the second timer, using, by the first wireless communications apparatus, the third wireless communication capability to communicate with the second wireless communications apparatus, where the first wireless communication capability is greater than the second wireless communication capability, and the second wireless communication capability is less than the third wireless communication capability; or the first wireless communication capability is less than the second wireless communication capability, and the second wireless communication capability is greater than the third wireless communication capability.

In this way, different timers are used to control an acceleration cycle and a deceleration cycle respectively, to effectively ensure timely adjustment of a transmission rate without waiting for the expiration of the specified time of the first timer.

In a possible design, the method further includes:

when the first wireless communications apparatus uses the second wireless communication capability to communicate with the second wireless communications apparatus, if the first wireless communications apparatus determines to adjust the wireless communication capability of the first wireless communications apparatus, sending, by the first wireless communications apparatus, third adjustment information to the second wireless communications apparatus, where the third adjustment information is used to indicate to adjust the wireless communication capability of the first wireless communications apparatus to a fourth wireless communication capability; and using, by the first wireless communications apparatus, the fourth wireless communication capability to communicate with the second wireless communications apparatus, where the fourth wireless communication capability is the maximum wireless communication capability or the minimum wireless communication capability.

In a possible design, when the first wireless communication capability is the maximum wireless communication capability among the plurality of wireless communication capabilities, an absolute value of a difference between a first transmission rate and a second transmission rate is a first value; when the first wireless communication capability is a wireless communication capability other than the maximum wireless communication capability, the absolute value of the difference between the first transmission rate and the second transmission rate is a second value;

and the first value is greater than the second value; and the first transmission rate is an upper limit of a transmission rate at which the first wireless communications apparatus uses the first wireless communication capability to communicate with the second wireless communications apparatus, and the second transmission rate is an upper limit of a transmission rate at which the first wireless communications apparatus uses the second wireless communication capability to communicate with the second wireless communications apparatus.

In this way, when the wireless communication capability of the first wireless communications apparatus is adjusted to the maximum wireless communication capability in an acceleration process, or when the wireless communication capability of the first wireless communications apparatus is adjusted to the minimum wireless communication capability in a deceleration process, because adjustment cannot be performed in a corresponding direction, the timer may no longer be started, thereby saving processing resources.

In a possible design, the first adjustment information includes any one or any combination of the following:

an uplink capability level corresponding to the second wireless communication capability, used to indicate to adjust that an uplink capability level supported by the first wireless communications apparatus to the uplink capability level corresponding to the second wireless communication capability;

a downlink capability level corresponding to the second wireless communication capability, used to indicate to adjust a downlink capability level supported by the first wireless communications apparatus to the downlink capability level corresponding to the second wireless communication capability;

a quantity of uplink carriers corresponding to the second wireless communication capability, used to indicate to adjust a quantity of uplink carriers supported by the first wireless communications apparatus to the quantity of uplink carriers corresponding to the second wireless communication capability;

a quantity of downlink carriers corresponding to the second wireless communication capability, used to indicate to adjust a quantity of downlink carriers supported by the first wireless communications apparatus to the quantity of downlink carriers corresponding to the second wireless communication capability;

a value of a BWP corresponding to the second wireless communication capability, used to indicate to adjust a value of a BWP supported by the first wireless communications apparatus to the value of the BWP corresponding to the second wireless communication capability;

a multiple-input multiple-output MIMO capability corresponding to the second wireless communication capability, used to indicate to adjust a MIMO capability supported by the first wireless communications apparatus to the MIMO capability corresponding to the second wireless communication capability; and a BSR value corresponding to the second wireless communication capability, where the BSR value corresponding to the second wireless communication capability is obtained by the first wireless communications apparatus based on a BSR weighting coefficient corresponding to the second wireless communication capability.

In a possible design, the determining, by the first wireless communications apparatus, to adjust the wireless communication capability of the first wireless communications apparatus includes:

if the first wireless communications apparatus determines that a temperature of the first wireless communications apparatus is greater than a first temperature threshold, or a battery power level is less than a first power threshold, or processor load is greater than a first load threshold, determining, by the first wireless communications apparatus, to reduce the wireless communication capability of the first wireless communications apparatus;

if the first wireless communications apparatus determines that a temperature of the first wireless communications apparatus is less than a second temperature threshold, a battery power level is greater than a second power threshold, and processor load is less than a second load threshold, determining, by the first wireless communications apparatus, to increase the wireless communication capability of the first wireless communications apparatus; or if the first wireless communications apparatus determines that a temperature of the first wireless communications apparatus is less than a second temperature threshold, a battery is in a charging state, and processor load is less than a second load threshold, determining, by the first wireless communications apparatus, to increase the wireless communication capability of the first wireless communications apparatus.

According to a second aspect, an embodiment of this application provides a wireless communication method, where the wireless communication method is applied to a first wireless communications apparatus, the first wireless communications apparatus is configured to have a plurality of wireless communication capabilities, and the method includes:

when the first wireless communications apparatus uses a first wireless communication capability to communicate with a second wireless communications apparatus, if the first wireless communications apparatus determines that a battery power level of the first wireless communications apparatus is less than a first power threshold, sending, by the first wireless communications apparatus, first adjustment information to the second wireless communications apparatus, where the first adjustment information is used to indicate to reduce the wireless communication capability of the first wireless communications apparatus to a second wireless communication capability; and using, by the first wireless communications apparatus, the second wireless communication capability to communicate with the second wireless communications apparatus, where the first wireless communication capability is any one of the plurality of wireless communication capabilities except a minimum wireless communication capability, and the second wireless communication capability is the minimum wireless communication capability among the plurality of wireless communication capabilities.

In this way, for power saving protection, when the wireless communication capability of the first wireless communications apparatus is adjusted, the wireless communication capability can be adjusted from the maximum wireless communication capability to the minimum wireless communication capability, thereby achieving a better power saving effect.

According to a third aspect, an embodiment of this application provides a wireless communication method, where the wireless communication method is applied to a first wireless communications apparatus, the first wireless communications apparatus is configured to have a plurality of wireless communication capabilities, and the method includes:

when the first wireless communications apparatus uses a third wireless communication capability to communicate with a second wireless communications apparatus, if the first wireless communications apparatus determines that a battery power level of the first wireless communications apparatus is greater than a first power threshold, or a battery is in a charging state, sending, by the first wireless communications apparatus, second adjustment information to the second wireless communications apparatus, where the second adjustment information is used to indicate to increase the wireless communication capability of the first wireless communications apparatus to a fourth wireless communication capability; and using, by the first wireless communications apparatus, the fourth wireless communication capability to communicate with the second wireless communications apparatus, where the third wireless communication capability is any one of the plurality of wireless communication capabilities except a maximum wireless communication capability, and the fourth wireless communication capability is the maximum wireless communication capability among the plurality of wireless communication capabilities.

In this way, after the power saving protection is determined to be released, the wireless communication capability can be directly adjusted from the minimum wireless communication capability to the maximum wireless communication capability, to provide a user with the best possible service in a timely manner and meet user experience.

According to a fourth aspect, an embodiment of this application provides a wireless communications apparatus, where the wireless communications apparatus is configured to have a plurality of wireless communication capabilities, and the wireless communications apparatus includes a communications module and a processing module;

the processing module is configured to: when the communications module uses a first wireless communication capability to communicate with a second wireless communications apparatus, if it is determined to adjust the wireless communication capability of the first wireless communications apparatus, send first adjustment information to the second wireless communications apparatus by using the communications module, and start a first timer, where the first adjustment information is used to indicate to adjust the wireless communication capability of the first wireless communications apparatus to a second wireless communication capability; and the communications module is configured to: within a specified time of the first timer, use the second wireless communication capability to communicate with the second wireless communications apparatus, where the first wireless communication capability is any one of the plurality of wireless communication capabilities, and the second wireless communication capability is any one of the plurality of wireless communication capabilities except a maximum wireless communication capability and a minimum wireless communication capability.

In a possible design, the processing module is further configured to: when the communications module uses the second wireless communication capability to communicate with the second wireless communications apparatus, if it is determined to adjust the wireless communication capability of the first wireless communications apparatus, send second adjustment information to the second wireless communications apparatus by using the communications module, and start a second timer, where the second adjustment information is used to indicate to adjust the wireless communication capability of the first wireless communications apparatus to a third wireless communication capability; and the communications module is further configured to: within a specified time of the second timer, use the third wireless communication capability to communicate with the second wireless communications apparatus, where the first wireless communication capability is greater than the second wireless communication capability, and the second wireless communication capability is less than the third wireless communication capability; or the first wireless communication capability is less than the second wireless communication capability, and the second wireless communication capability is greater than the third wireless communication capability.

In a possible design, the processing module is further configured to: when the communications module uses the second wireless communication capability to communicate with the second wireless communications apparatus, if it is determined to adjust the wireless communication capability of the first wireless communications apparatus, send third adjustment information to the second wireless communications apparatus by using the communications module, where the third adjustment information is used to indicate to adjust the wireless communication capability of the first wireless communications apparatus to a fourth wireless communication capability; and the communications module is further configured to use the fourth wireless communication capability to communicate with the second wireless communications apparatus, where the fourth wireless communication capability is the maximum wireless communication capability or the minimum wireless communication capability.

An embodiment of this application further provides a wireless communications apparatus, where the wireless communications apparatus is configured to have a plurality of wireless communication capabilities, and the wireless communications apparatus includes:

a processing unit and a storage unit, where the storage unit is configured to store a computer instruction, and when the computer instruction is run in the processing unit, the wireless communications apparatus is enabled to perform the wireless communication method according to any one of the foregoing aspects or designs.

In a possible design, the wireless communications apparatus is a semiconductor chip, and the semiconductor chip is disposed in a terminal device.

An embodiment of this application further provides a computer-readable storage medium, where the computer-readable storage medium stores program code, and when the program code is executed by a wireless communications apparatus, the wireless communications apparatus is enabled to perform the wireless communication method according to any one of the foregoing aspects or designs.

An embodiment of this application further provides a computer program product, where when program code included in the computer program product is executed by a wireless communications apparatus, the wireless communications apparatus is enabled to perform the wireless communication method according to any one of the foregoing aspects or designs.

BRIEF DESCRIPTION OF DRAWINGS

FIG. 1 is a schematic diagram of a system architecture to which an embodiment of this application is applicable;

FIG. 2 is a schematic flowchart corresponding to a wireless communication method according to an embodiment of this application;

DESCRIPTION OF EMBODIMENTS

Figure 3A:
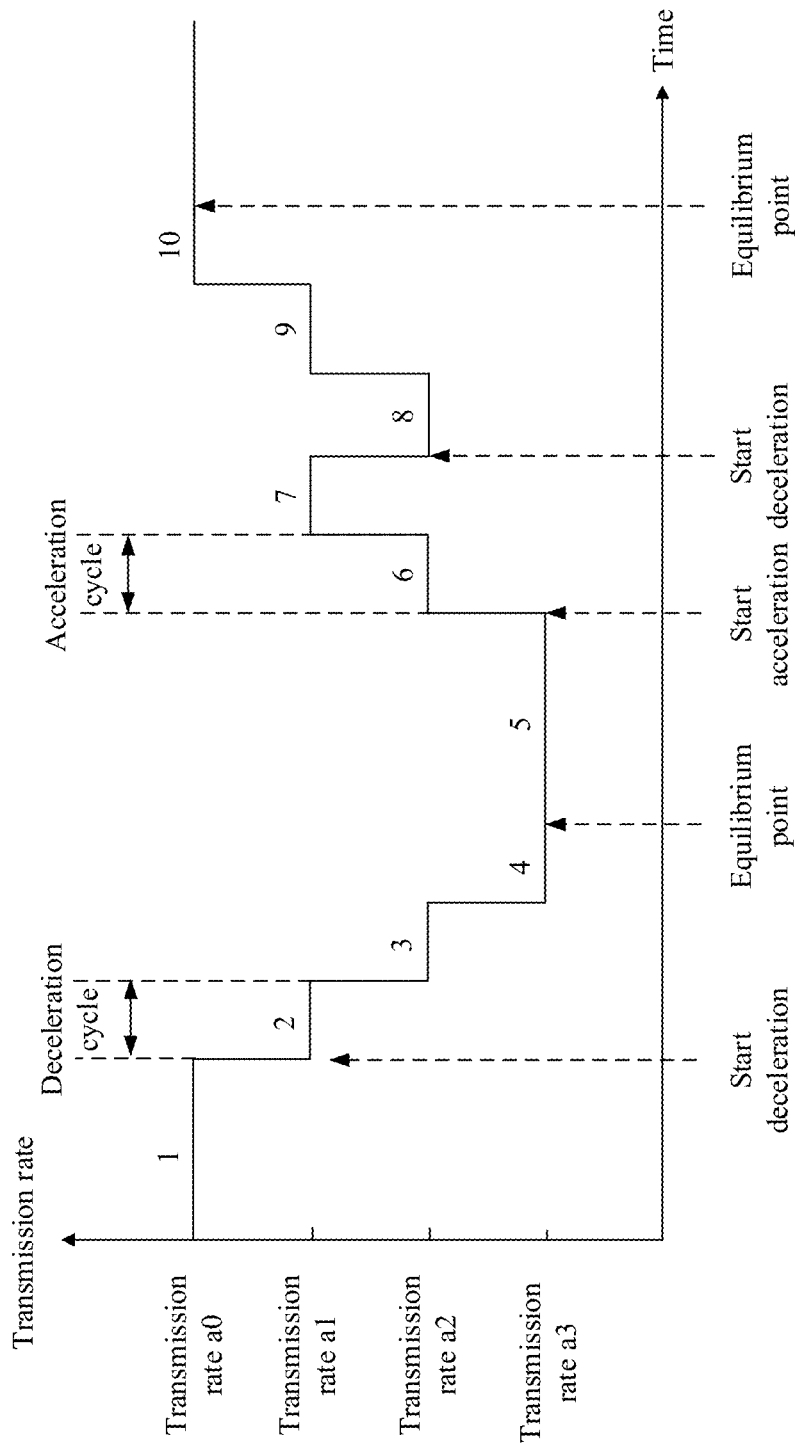
FIG. 3a is an example diagram of a process of adjusting a wireless communication capability according to an embodiment of this application.

The following describes the embodiments of this application with reference to the accompanying drawings in this specification.

FIG. 1 is a schematic diagram of a system architecture to which an embodiment of this application is applicable. As shown in FIG. 1, the system architecture includes a network device 101 and one or more terminal devices, such as a terminal device 1021, a terminal device 1022, and a terminal device 1023 shown in FIG. 1. The network device 101 can transmit downlink data to the terminal device 1021, the terminal device 1022, and the terminal device 1023 through a network, and the terminal device 1021, the terminal device 1022, and the terminal device 1023 can transmit uplink data to the network device 101 through the network.

In this application, the network device may be a base station (base station, BS) device. The base station device may also be referred to as a base station, which is an apparatus that is deployed in a radio access network to provide a wireless communication function. For example, a device that provides a base station function in a 2G network includes a base transceiver station (base transceiver station, BTS) and a base station controller (base station controller, BSC), a device that provides a base station function in a 3G network includes a NodeB (NodeB) and a radio network controller (radio network controller, RNC), a device that provides a base station function in a 4G network includes an evolved NodeB (evolved NodeB, eNB), and a device that provides a base station function in a 5G network includes a new radio NodeB (New Radio NodeB, gNB), a centralized unit (Centralized Unit, CU), a distributed unit (Distributed Unit), and a new radio controller.

The terminal device is a device with a wireless transceiver function, and the terminal device may be deployed on land, for example, an indoor device, an outdoor device, a handheld device, or an in-vehicle device, or may be deployed on the water (for example, on a ship), or may be deployed in the air (for example, on a plane, a balloon, or a satellite). The terminal device may be a mobile phone (mobile phone), a tablet computer (Pad), a computer with a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), or the like.

In this application, the system architecture shown in FIG. 1 is mainly used as an example for description, but the system architecture is not limited thereto.

A communications system to which the foregoing system architecture is applicable includes but is not limited to: time division duplexing-long term evolution (time division duplexing-long term evolution, TDD LTE), frequency division duplexing-long term evolution (frequency division duplexing-long term evolution, FDD LTE), long term evolution-advanced (long term evolution-advanced, LTE-A), and various future evolved wireless communications systems (for example, a 5G NR system).

In the system architecture shown in FIG. 1, during the communication between the terminal device and the network device, extreme scenarios such as relatively high temperature of the terminal device, processor overload, and excessively low power may occur, which may cause a series of problems. Therefore, protection for extreme scenarios (such as overheating protection, overload protection, and power saving protection, which are not limited) needs to be performed on the terminal device.

A manner of implementing overheating protection is as follows: The terminal device reports support for the overheating protection feature to the network device, and correspondingly, the network device configures enabling of the overheating protection detection; after detecting that the temperature of the terminal device is excessively high (overheating), the terminal device reports capability degradation targets (for example, an uplink target capability level, a downlink target capability level, a quantity of uplink carriers, and a quantity of downlink carriers) to the network device where the network device can reduce related configuration of the terminal device based on the capability degradation targets reported by the terminal device, and reduce scheduling of the terminal device. After detecting that the temperature resumes normal (no longer overheating), the terminal device reports a capability of releasing overheating protection to the network device. Correspondingly, the network device restores the related configuration and scheduling of the terminal device.

In the foregoing manner, after detecting overheating, the terminal device reduces its capability to a sufficiently low level at a time (to be specific, a transmission rate between the terminal device and the network device is reduced from a maximum transmission rate supported by the terminal device to a minimum transmission rate supported by the terminal device). After the temperature resumes normal, the terminal device releases overheating protection at a time, that is, increases the capability of the terminal device from the sufficiently low level to the normal level at a time. It can be learned that, in the foregoing manner, during overheating protection, a relatively large range of adjusting the capability of the terminal device (including a range of reducing the capability of the terminal device and a range of increasing the capability of the terminal device) may affect user experience. In addition, due to the relatively large range of increasing the capability of the terminal device, the temperature may rebound quickly after the overheating protection is released, and the overheating protection needs to be performed again. Consequently, a turbulent state may be formed, there is noticeable jaggedness in traffic, and a user can obviously notice that a communication speed is unstable, that is, sometimes high and sometimes low.

Based on this, an embodiment of this application provides a wireless communication method, to resolve technical problems that a communication speed is unstable and user experience is affected due to a relatively large range of adjusting the capability of the terminal device during protection for extreme scenarios. The first wireless communications apparatus in this embodiment of this application may be any terminal device or a semiconductor chip in the terminal device shown in FIG. 1. When the first wireless communications apparatus is a semiconductor chip, the wireless communications apparatus may be a system-on-a-chip (System-on-a-Chip, SoC) main chip or a baseband modem (modem) chip. The second wireless communications apparatus may be the network device or a semiconductor chip in the network device shown in FIG. 1.

Embodiment 1

FIG. 2 is a schematic flowchart corresponding to a wireless communication method according to an embodiment of this application. The wireless communication method may be applied to a first wireless communications apparatus, and the first wireless communications apparatus is configured to have a plurality of wireless communication capabilities. As shown in FIG. 2, the method includes the following steps:

Step 201: When the first wireless communications apparatus uses a first wireless communication capability to communicate with a second wireless communications apparatus, if the first wireless communications apparatus determines to adjust the wireless communication capability of the first wireless communications apparatus, the first wireless communications apparatus sends first adjustment information to the second wireless communications apparatus, and starts a first timer, where the first adjustment information is used to indicate to adjust the wireless communication capability of the first wireless communications apparatus to a second wireless communication capability.

Step 202: Within a specified time of the first timer, the first wireless communications apparatus uses the second wireless communication capability to communicate with the second wireless communications apparatus.

In this embodiment of this application, the second wireless communication capability is any one of the plurality of wireless communication capabilities except a maximum wireless communication capability and a minimum wireless communication capability. In other words, when the wireless communication capability is adjusted, an adjustment range is relatively small, to effectively avoid technical problems that a communication speed is unstable and user experience is affected due to a relatively large adjustment range. Further, because the first wireless communications apparatus is configured to have a plurality of wireless communication capabilities, after the specified time of the first timer expires, the first wireless communications apparatus can cyclically perform the foregoing steps, thereby gradually adjusting the wireless communication capability of the first wireless communications apparatus and performing protection for extreme scenarios in a smoother manner. In this way, the first wireless communications apparatus can maintain a relatively balanced state during communication, providing a user with a more stable service and improving user experience.

That the first wireless communications apparatus determines to adjust the wireless communication capability of the first wireless communications apparatus may be specifically as follows: The first wireless communications apparatus determines to reduce the wireless communication capability of the first wireless communications apparatus, or the first wireless communications apparatus determines to increase the wireless communication capability of the first wireless communications apparatus.

Specifically, there may be a plurality of cases in which the first wireless communications apparatus determines to reduce the wireless communication capability of the first wireless communications apparatus (in this case, the first wireless communication capability may be any wireless communication capability other than the minimum wireless communication capability). Correspondingly, there may also be a plurality of cases in which the first wireless communications apparatus determines to increase the wireless communication capability of the first wireless communications apparatus (in this case, the first wireless communication capability may be any wireless communication capability other than the maximum wireless communication capability).

In an example, the methods in this embodiment of this application can be separately applied to protection for various extreme scenarios, such as overheating protection, overload protection, and power saving protection.

Specifically, during protection for the overheating scenario, if the first wireless communications apparatus determines that a temperature of the first wireless communications apparatus is greater than a first temperature threshold, the first wireless communications apparatus can determine to reduce the wireless communication capability of the first wireless communications apparatus; or if the first wireless communications apparatus determines that a temperature of the first wireless communications apparatus is less than a second temperature threshold, the first wireless communications apparatus can determine to increase the wireless communication capability of the first wireless communications apparatus. During protection for the overload scenario, if the first wireless communications apparatus determines that processor load is greater than a first load threshold, the first wireless communications apparatus can determine to reduce the wireless communication capability of the first wireless communications apparatus; or if the first wireless communications apparatus determines that processor load is less than a second load threshold, the first wireless communications apparatus can determine to increase the wireless communication capability of the first wireless communications apparatus. During protection for the power saving scenario, if the first wireless communications apparatus determines that a battery power level is less than a first power threshold, the first wireless communications apparatus can determine to reduce the wireless communication capability of the first wireless communications apparatus; or if the first wireless communications apparatus determines that a battery power level is greater than a second power threshold, or a battery is in a charging state, the first wireless communications apparatus can determine to increase the wireless communication capability of the first wireless communications apparatus.

In another example, in this embodiment of this application, protection for a plurality of extreme scenarios such as overheating protection, overload protection, and power saving protection may also be comprehensively considered to implement protection for extreme scenarios more properly and effectively.

Specifically, if the first wireless communications apparatus determines that a temperature of the first wireless communications apparatus is greater than a first temperature threshold, or a battery power level of a terminal device is less than a first power threshold, or processor load is greater than a first load threshold, the first wireless communications apparatus can determine to reduce the wireless communication capability of the first wireless communications apparatus; if the first wireless communications apparatus determines that a temperature of the first wireless communications apparatus is less than a second temperature threshold, a battery power level is greater than a second power threshold, and processor load is less than a second load threshold, the first wireless communications apparatus determines to increase the wireless communication capability of the first wireless communications apparatus; or if the first wireless communications apparatus determines that a temperature of the first wireless communications apparatus is less than a second temperature threshold, a battery is in a charging state, and processor load is less than a second load threshold, the first wireless communications apparatus determines to increase the wireless communication capability of the first wireless communications apparatus.

Values of the first temperature threshold, the first power threshold, the first load threshold, the second temperature threshold, the second power threshold, and the second load threshold mentioned above can be all set by a person skilled in the art depending on actual needs. This is not specifically limited. Further, the second temperature threshold may be slightly less than the first temperature threshold, the second power threshold may be slightly greater than the first power threshold, and the second load threshold may be slightly less than the first load threshold. Overheating protection is used as an example. If the first wireless communications apparatus determines that the temperature of the first wireless communications apparatus is greater than the first temperature threshold (for example, 100 degrees Celsius), the overheating protection can be started, and when the temperature decreases to below the second temperature threshold (for example, 80 degrees Celsius), the overheating protection can be released. Because the second temperature threshold is slightly less than the first temperature threshold, the temperature of the first wireless communications apparatus can be stabilized in a range from 80 degrees Celsius to 100 degrees Celsius, avoiding frequent adjustment of the wireless communication capability of the first wireless communications apparatus, and providing the best possible user experience.

In this embodiment of this application, when the first wireless communications apparatus is a semiconductor chip in a terminal device, the temperature of the first wireless communications apparatus is a temperature of the semiconductor chip. In this case, the first temperature threshold may be a temperature threshold corresponding to the semiconductor chip. When the first wireless communications apparatus is a terminal device, the temperature of the first wireless communications apparatus may be a temperature of one or more modules in the terminal device, such as a semiconductor chip, a battery, and a subscriber identity module (subscriber identity module, SIM) card. Correspondingly, the first temperature threshold may be a temperature threshold corresponding to the semiconductor chip, the battery, or the SIM card, which is not specifically limited.

In this embodiment of this application, the plurality of wireless communication capabilities of the first wireless communications apparatus may be preconfigured. During specific implementation, the plurality of wireless communication capabilities of the first wireless communications apparatus can be configured by a person skilled in the art by setting values of various parameters that affect the wireless communication capabilities of the first wireless communications apparatus. There may be one or more parameters that affect a value of a wireless transmission capability of the first wireless communications apparatus. In an example, the parameters that affect the value of the wireless transmission capability of the first wireless communications apparatus include any one or any combination of the following: an uplink capability level supported by the first wireless communications apparatus; a downlink capability level supported by the first wireless communications apparatus; a quantity of uplink carriers supported by the first wireless communications apparatus; a quantity of downlink carriers supported by the first wireless communications apparatus; a value of a BWP supported by the first wireless communications apparatus; a multiple-input multiple-output (multiple-input multiple-output, MIMO) capability supported by the first wireless communications apparatus; and a buffer status report (buffer status report, BSR) weighting coefficient. It should be noted that the foregoing enumeration is merely an example description, and may include other parameters in another possible embodiment, which is not specifically limited.

In an example, the first wireless communications apparatus is a terminal device in an LTE communications system; and the parameters that affect the value of the wireless transmission capability of the first wireless communications apparatus include the uplink capability level supported by the first wireless communications apparatus, the downlink capability level supported by the first wireless communications apparatus, the quantity of uplink carriers supported by the first wireless communications apparatus, and the quantity of downlink carriers supported by the first wireless communications apparatus. The values of the foregoing parameters corresponding to different wireless communication capabilities of the first wireless communications apparatus may be different. Table 1 shows an example of the values of the parameters respectively corresponding to the plurality of wireless communication capabilities of the first wireless communications apparatus.

TABLE 1

Example 1 of the values of the parameters respectively corresponding to the plurality of wireless communication capabilities

| Wireless communication capability | Downlink capability level | Uplink capability level | Quantity of downlink carriers | Quantity of uplink carriers |
|---|---|---|---|---|
| Wireless communication capability 1 | Category 19 | Category 13 | 4 | 2 |
| Wireless communication capability 2 | Category 12 | Category 13 | 2 | 2 |
| Wireless communication capability 3 | Category 12 | Category 5 | 2 | 1 |
| Wireless communication capability 4 | Category 6 | Category 5 | 1 | 1 |

In another example, the first wireless communications apparatus is a terminal device in an NR communications system; and the parameters that affect the value of the wireless transmission capability of the first wireless communications apparatus include the quantity of uplink carriers supported by the first wireless communications apparatus, the quantity of downlink carriers supported by the first wireless communications apparatus, the value of the BWP supported by the first wireless communications apparatus, and the MIMO capability supported by the first wireless communications apparatus, where the MIMO capability may specifically include a quantity of MIMO layers, incapability of supporting MIMO, and so on. The values of the foregoing parameters corresponding to different wireless communication capabilities of the first wireless communications apparatus may be different. Table 2 shows an example of the values of the parameters respectively corresponding to the plurality of wireless communication capabilities of the first wireless communications apparatus.

TABLE 2

Example 2 of the values of the parameters respectively corresponding to the plurality of wireless communication capabilities

| Wireless communication capability | Quantity of downlink carriers | Quantity of uplink carriers | value of a BWP of | MIMO capability |
|---|---|---|---|---|
| Wireless communication capability 1 | 4 | 2 | 100 MHz | 8 layers |
| Wireless communication capability 2 | 2 | 2 | 100 MHz | 8 layers |
| Wireless communication capability 3 | 2 | 1 | 100 MHz | 8 layers |
| Wireless communication capability 4 | 1 | 1 | 20 MHz | 8 layers |
| Wireless communication capability 5 | 1 | 1 | 20 MHz | 2 layers |
| Wireless communication capability 6 | 1 | 1 | 20 MHz | Incapability of supporting MIMO |

It should be noted that the foregoing Table 1 and Table 2 are merely simple examples. During specific implementation, a plurality of possible configurations may be performed depending on actual needs, which is not specifically limited.

It can be learned from the foregoing description that, the first adjustment information may include any one or any combination of the following: an uplink capability level corresponding to the second wireless communication capability, used to indicate to adjust the uplink capability level supported by the first wireless communications apparatus to the uplink capability level corresponding to the second wireless communication capability; a downlink capability level corresponding to the second wireless communication capability, used to indicate to adjust the downlink capability level supported by the first wireless communications apparatus to the downlink capability level corresponding to the second wireless communication capability; a quantity of uplink carriers corresponding to the second wireless communication capability, used to indicate to adjust the quantity of uplink carriers supported by the first wireless communications apparatus to the quantity of uplink carriers corresponding to the second wireless communication capability; a quantity of downlink carriers corresponding to the second wireless communication capability, used to indicate to adjust the quantity of downlink carriers supported by the first wireless communications apparatus to the quantity of downlink carriers corresponding to the second wireless communication capability; a value of a BWP corresponding to the second wireless communication capability, used to indicate to adjust the value of the BWP supported by the first wireless communications apparatus to the value of the BWP corresponding to the second wireless communication capability; a multiple-input multiple-output MIMO capability corresponding to the second wireless communication capability, used to indicate to adjust the MIMO capability supported by the first wireless communications apparatus to the MIMO capability corresponding to the second wireless communication capability; and a BSR value corresponding to the second wireless communication capability, where the BSR value corresponding to the second wireless communication capability is obtained by the first wireless communications apparatus based on a BSR weighting coefficient corresponding to the second wireless communication capability. For content included in the second adjustment information and the third adjustment information, refer to the content included in the foregoing first adjustment information. Details are not described again.

In this embodiment of this application, the content that may be included in the first adjustment information, such as the MIMO capability corresponding to the second wireless communication capability, a quantity of carriers corresponding to the second wireless communication capability (including the quantity of uplink carriers and the quantity of downlink carriers), and a capability level corresponding to the second wireless communication capability (including the uplink capability level and the downlink capability level) can be reported to the second wireless communications apparatus by using UE assistance information (UEAssistanceInformation), and a timer can be started during reporting. Further, in an acceleration process, if the first wireless communications apparatus is restored to a normal capability, when the foregoing content is reported by using UEAssistanceInformation, an OverheatingAssistance IE may not include related information that is used to indicate to a network device that the terminal device is restored to the normal capability. The BSR value corresponding to the second wireless communication capability that may be included in the first adjustment information may not be reported by using UEAssistanceInformation. Instead, when a MAC needs to report the BSR, the BSR value is directly sent to the second wireless communications apparatus, and a timer may be started when the BSR weighting coefficient is adjusted, instead of starting the timer when the BSR value is reported.

In this embodiment of this application, when the first wireless communications apparatus uses different wireless communication capabilities to communicate with the second wireless communications apparatus, upper limits of transmission rates are also different (that is, different wireless communication capabilities correspond to different upper limits of transmission rates). Therefore, reducing the wireless communication capability may be understood as reducing the upper limit of the transmission rate between the first wireless communications apparatus and the second wireless communications apparatus (deceleration), and increasing the wireless communication capability may be understood as increasing the upper limit of the transmission rate between the first wireless communications apparatus and the second wireless communications apparatus (acceleration). Further, the deceleration cycle and the acceleration cycle can be controlled by only one timer (such as the first timer), or the deceleration cycle and the acceleration cycle can be controlled by different timers (such as the first timer and a second timer) respectively.

When the deceleration cycle and the acceleration cycle are controlled by different timers, the foregoing method may further include: when the first wireless communications apparatus uses the second wireless communication capability to communicate with the second wireless communications apparatus, if the first wireless communications apparatus determines to adjust the wireless communication capability of the first wireless communications apparatus, sending, by the first wireless communications apparatus, second adjustment information to the second wireless communications apparatus, and starting the second timer, where the second adjustment information is used to indicate to adjust the wireless communication capability of the first wireless communications apparatus to a third wireless communication capability; and within a specified time of the second timer, using, by the first wireless communications apparatus, the third wireless communication capability to communicate with the second wireless communications apparatus.

If the first wireless communication capability is greater than the second wireless communication capability, and the second wireless communication capability is less than the third wireless communication capability, it may be understood that the deceleration cycle is controlled by the first timer, and the acceleration cycle is controlled by the second timer. In this case, if the first wireless communications apparatus determines to increase the wireless communication capability of the first wireless communications apparatus, the first wireless communications apparatus can ignore the running first timer and directly start the second timer. If the first wireless communication capability is less than the second wireless communication capability, and the second wireless communication capability is greater than the third wireless communication capability, it may be understood that the acceleration cycle is controlled by the first timer, and the deceleration cycle is controlled by the second timer. In this case, if the first wireless communications apparatus determines to reduce the wireless communication capability of the first wireless communications apparatus, the first wireless communications apparatus can ignore the running first timer and directly start the second timer. In this way, different timers are used to control the acceleration cycle and the deceleration cycle respectively, to effectively ensure timely adjustment of the transmission rate without waiting for the expiration of the specified time of the first timer.

In this embodiment of this application, when the first wireless communication capability is the maximum wireless communication capability among the plurality of wireless communication capabilities, an absolute value of a difference between a first transmission rate and a second transmission rate is a first value; when the first wireless communication capability is a wireless communication capability other than the maximum wireless communication capability, the absolute value of the difference between the first transmission rate and the second transmission rate is a second value; and the first value is greater than the second value; and the first transmission rate is an upper limit of a transmission rate at which the first wireless communications apparatus uses the first wireless communication capability to communicate with the second wireless communications apparatus, and the second transmission rate is an upper limit of a transmission rate at which the first wireless communications apparatus uses the second wireless communication capability to communicate with the second wireless communications apparatus. In other words, when the wireless communication capability of the first wireless communications apparatus is the maximum wireless communication capability, the adjustment range is greater than that in other situations, so that when the wireless communication capability is reduced from the maximum wireless communication capability, the reduction can be rapid, thereby effectively preventing the first wireless communications apparatus from entering an abnormal state in an extreme scenario.

In this embodiment of this application, the foregoing method may further include: when the first wireless communications apparatus uses the second wireless communication capability to communicate with the second wireless communications apparatus, if the first wireless communications apparatus determines to adjust the wireless communication capability of the first wireless communications apparatus, sending, by the first wireless communications apparatus, third adjustment information to the second wireless communications apparatus, where the third adjustment information is used to indicate to adjust the wireless communication capability of the first wireless communications apparatus to a fourth wireless communication capability; and using, by the first wireless communications apparatus, the fourth wireless communication capability to communicate with the second wireless communications apparatus, where the fourth wireless communication capability is the maximum wireless communication capability or the minimum wireless communication capability. In other words, when the wireless communication capability of the first wireless communications apparatus is adjusted to the maximum wireless communication capability in the acceleration process, or when the wireless communication capability of the first wireless communications apparatus is adjusted to the minimum wireless communication capability in the deceleration process, because adjustment cannot be performed in a corresponding direction, the timer may no longer be started, thereby saving processing resources.

Figure 3B:
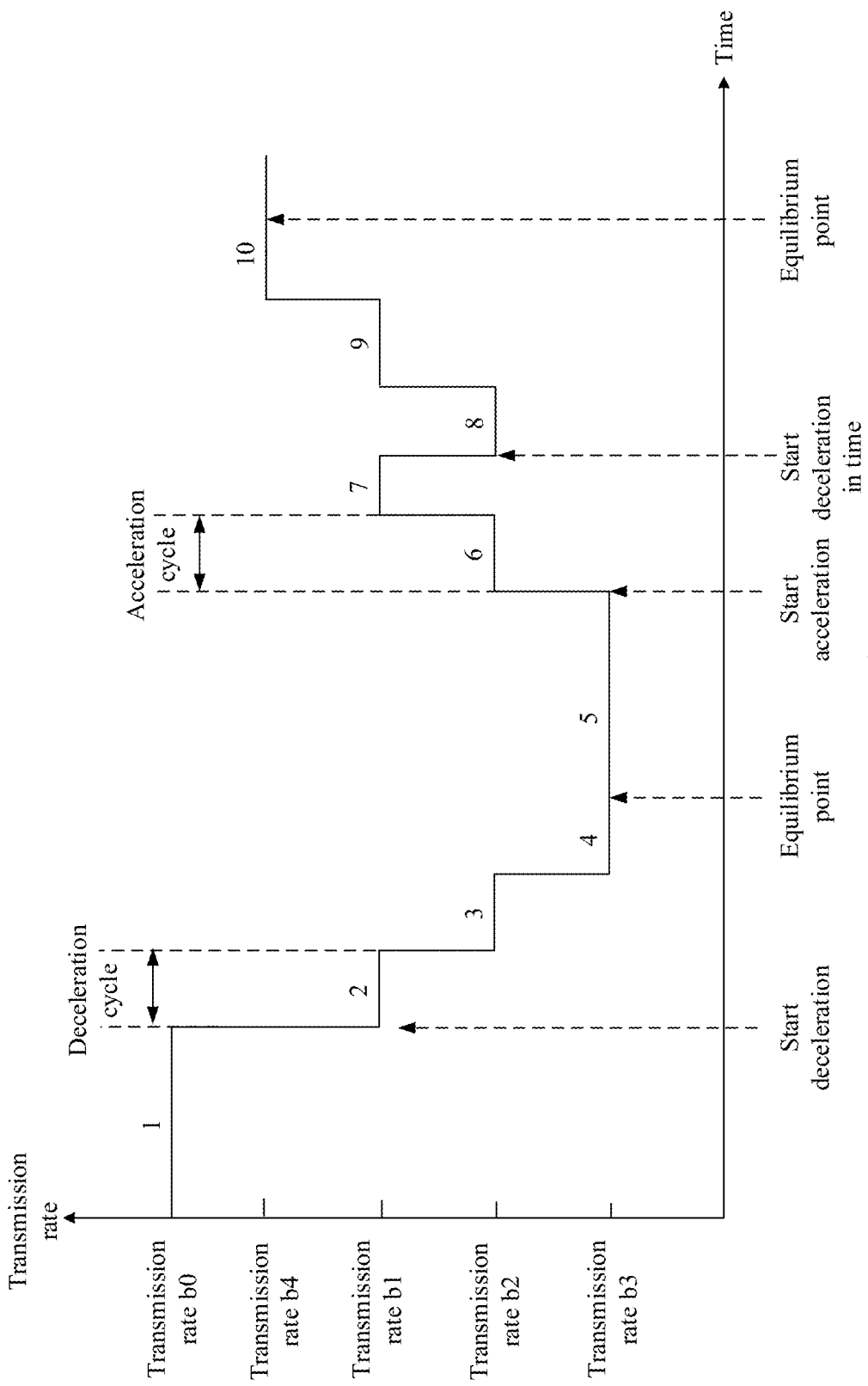
FIG. 3b is an example diagram of another process of adjusting a wireless communication capability according to an embodiment of this application.

An example in which the first wireless communications apparatus is the terminal device and the second wireless communications apparatus is the network device is used below to describe possible situations of adjusting the wireless communication capability in the embodiments of this application with reference to FIG. 3a and FIG. 3b. FIG. 3a and FIG. 3b show only adjustment processes of the terminal device in a specific time period. It can be learned from the foregoing description that, there is a correspondence between the wireless communication capability used by the terminal device and the upper limit of the transmission rate between the terminal device and the network device. Therefore, in FIG. 3a and FIG. 3b, adjustment of the upper limit of the transmission rate is used as an example to indicate adjustment of the wireless communication capability.

FIG. 3a is an example diagram of a process of adjusting a wireless communication capability according to an embodiment of this application. In the example of FIG. 3a, the terminal device is configured to have at least four wireless communication capabilities: an upper limit of a transmission rate corresponding to a wireless communication capability 1 is a transmission rate a0; an upper limit of a transmission rate corresponding to a wireless communication capability 2 is a transmission rate a1; an upper limit of a transmission rate corresponding to a wireless communication capability 3 is a transmission rate a2; and an upper limit of a transmission rate corresponding to a wireless communication capability 4 is a transmission rate a3.

As shown in FIG. 3a, stage 1. The upper limit of the transmission rate between the terminal device and the network device is the transmission rate a0, where the transmission rate a0 is an upper limit of a transmission rate corresponding to a maximum wireless communication capability among the plurality of wireless communication capabilities of the terminal device. Stage 2. If the terminal device determines that the upper limit of the transmission rate needs to be reduced, the terminal device starts deceleration for the first time. In this case, the upper limit of the transmission rate is reduced from the transmission rate a0 to the transmission rate a1, and the deceleration cycle is the specified time of the first timer. Stage 3. After the specified time of the first timer expires, if the terminal device determines that the upper limit of the transmission rate still needs to be reduced, the terminal device starts deceleration again. In this case, the upper limit of the transmission rate is reduced from the transmission rate a1 to the transmission rate a2, and the deceleration cycle is the specified time of the first timer. Stage 4. After the specified time of the first timer expires, if the terminal device determines that the upper limit of the transmission rate still needs to be reduced, the terminal device starts deceleration again. In this case, the upper limit of the transmission rate is reduced from the transmission rate a2 to the transmission rate a3, and the deceleration cycle is the specified time of the first timer. It should be noted that if the transmission rate a3 is an upper limit of a transmission rate corresponding to a minimum wireless communication capability among the plurality of wireless communication capabilities of the terminal device, the first timer may no longer be started. Stage 5. After the specified time of the first timer expires, if the terminal device determines not to adjust the transmission rate (equilibrium point) any more, a current state is maintained, and the upper limit of the transmission rate is still the transmission rate a3. Stage 6. If the terminal device determines to increase the upper limit of the transmission rate, the terminal device starts an acceleration process. In this case, the upper limit of the transmission rate is increased from the transmission rate a3 to the transmission rate a2, and the acceleration cycle is the specified time of the first timer. Stage 7. After the specified time of the first timer expires, if the terminal device still determines to increase the upper limit of the transmission rate, the terminal device starts acceleration again. In this case, the upper limit of the transmission rate is increased from the transmission rate a2 to the transmission rate a1, and the acceleration cycle is the specified time of the first timer. Stage 8. After the specified time of the first timer expires, if the terminal device determines that the upper limit of the transmission rate needs to be reduced, the terminal device starts deceleration. In this case, the upper limit of the transmission rate is reduced from the transmission rate a1 to the transmission rate a2, and the deceleration cycle is the specified time of the first timer. Stage 9. After the specified time of the first timer expires, if the terminal device determines that the upper limit of the transmission rate needs to be increased, the terminal device starts acceleration. In this case, the upper limit of the transmission rate is increased from the transmission rate a2 to the transmission rate a1, and the acceleration cycle is the specified time of the first timer. Stage 10. After the specified time of the first timer expires, if the terminal device determines that the upper limit of the transmission rate still needs to be increased, the terminal device starts acceleration again. In this case, the upper limit of the transmission rate is increased from the transmission rate a1 to the transmission rate a0, and the first timer may no longer be started. Subsequently, if the terminal device determines that the upper limit (an equilibrium point) of the transmission rate does not need to be adjusted, the current state is maintained, and the upper limit of the transmission rate is the transmission rate a0. Both the deceleration process and the acceleration process in the foregoing description can be implemented by performing the foregoing step 201 and step 202.

It can be learned from the foregoing descriptions that, (1) both the deceleration cycle and the acceleration cycle are controlled by the same timer (such as the first timer); (2) the values of a0-a1, a1-a2, and a2-a3 may be the same or different; to be specific, a range of adjusting the upper limit of the transmission rate each time may not be limited, and is specifically configured by a person skilled in the art depending on actual needs; and (3) in the deceleration process, the transmission rate a0 is sequentially reduced to the transmission rate a3, and in the acceleration process, the transmission rate a3 is sequentially increased to the transmission rate a0.

FIG. 3b is an example diagram of another process of adjusting a wireless communication capability according to an embodiment of this application. In the example of FIG. 3b, the terminal device is configured to have at least five wireless communication capabilities: an upper limit of a transmission rate corresponding to a wireless communication capability 1 is a transmission rate b0; an upper limit of a transmission rate corresponding to a wireless communication capability 2 is a transmission rate b1; an upper limit of a transmission rate corresponding to a wireless communication capability 3 is a transmission rate b2; an upper limit of a transmission rate corresponding to a wireless communication capability 4 is a transmission rate b3; and an upper limit of a transmission rate corresponding to a wireless communication capability 5 is a transmission rate b4.

As shown in FIG. 3a, stage 1. The upper limit of the transmission rate between the terminal device and the network device is the transmission rate b0, where the transmission rate b0 is an upper limit of a transmission rate corresponding to a maximum wireless communication capability among the plurality of wireless communication capabilities of the terminal device. Stage 2. If the terminal device determines that the upper limit of the transmission rate needs to be reduced, the terminal device starts deceleration for the first time. In this case, the upper limit of the transmission rate is reduced from the transmission rate b0 to the transmission rate b1, and the deceleration cycle is the specified time of the first timer. Stage 3. After the specified time of the first timer expires, if the terminal device determines that the upper limit of the transmission rate still needs to be reduced, the terminal device starts deceleration again. In this case, the upper limit of the transmission rate is reduced from the transmission rate b1 to the transmission rate b2, and the deceleration cycle is the specified time of the first timer. Stage 4. After the specified time of the first timer expires, if the terminal device determines that the upper limit of the transmission rate still needs to be reduced, the terminal device starts deceleration again. In this case, the upper limit of the transmission rate is reduced from the transmission rate b2 to the transmission rate b3, and the deceleration cycle is the specified time of the first timer. It should be noted that if the transmission rate b3 is an upper limit of a transmission rate corresponding to a minimum wireless communication capability among the plurality of wireless communication capabilities of the terminal device, the first timer may no longer be started. Stage 5. After the specified time of the first timer expires, if the terminal device determines that the transmission rate (an equilibrium point) does not need to be adjusted, a current state is maintained, and the transmission rate is still the transmission rate b3. Stage 6. If the terminal device determines to increase the upper limit of the transmission rate, the terminal device starts an acceleration process. In this case, the upper limit of the transmission rate is increased from the transmission rate b3 to the transmission rate b2, and the acceleration cycle is the specified time of the second timer. Stage 7. After the specified time of the second timer expires, if the terminal device determines to increase the upper limit of the transmission rate, the terminal device starts acceleration again. In this case, the upper limit of the transmission rate is increased from the transmission rate b2 to the transmission rate b1, and the acceleration cycle is the specified time of the second timer. Stage 8. If the terminal device determines that the upper limit of the transmission rate needs to be reduced, the terminal device starts deceleration. In this case, the upper limit of the transmission rate is reduced from the transmission rate b1 to the transmission rate b2, and the deceleration cycle is the specified time of the first timer. Stage 9. After the specified time of the first timer expires, if the terminal device determines to increase the upper limit of the transmission rate, the terminal device starts acceleration. In this case, the upper limit of the transmission rate is increased from the transmission rate b2 to the transmission rate b1, and the acceleration cycle is the specified time of the second timer. Stage 10. After the specified time of the second timer expires, if the terminal device determines to increase the upper limit of the transmission rate, the terminal device starts acceleration again. In this case, the upper limit of the transmission rate is increased from the transmission rate b1 to the transmission rate b4, and the acceleration cycle is the specified time of the second timer. After the specified time of the second timer expires, if the terminal device determines that the transmission rate (an equilibrium point) does not need to be adjusted, a current state is maintained, and the transmission rate is the transmission rate b4. Both the deceleration process and the acceleration process in the foregoing description can be implemented by performing the foregoing step 201 and step 202.

It can be learned from the foregoing descriptions that, (1) the deceleration cycle is controlled by the first timer, and the acceleration cycle is controlled by the second timer. Therefore, in the acceleration process, if it is determined that the transmission rate needs to be reduced, the deceleration process (refer to stage 8 ⑧ shown in FIG. 3b) can be started immediately. Deceleration can be started without waiting until expiration of the specified time of the second timer, so that timely deceleration can be implemented and protection for an extreme scenario can be implemented more effectively. Similarly, in the deceleration process, if it is determined that the transmission rate needs to be increased, the acceleration process can be started immediately. In another embodiment, the deceleration cycle may be controlled by the second timer, and the acceleration cycle may be controlled by the first timer, which is not specifically limited. (2) At different stages, adjustment ranges of the upper limits of the transmission rates may be different. For example, when deceleration is started for the first time, an adjustment range is relatively large, thereby preventing the first wireless communications apparatus from entering an abnormal state in an extreme scenario. In addition, because different timers are used for deceleration and acceleration respectively, during specific implementation, rapid deceleration and slow acceleration (that is, rapid reduction and slow increase) can be implemented by controlling duration of the first timer and the second timer.

The following describes examples of the embodiments of this application with reference to specific embodiments (Embodiment 2 to Embodiment 6).

Embodiment 2

In Embodiment 2, an applicable communications system may be an LTE communications system, an applicable scenario is overheating protection, and one timer (such as a timer T345) is used to control an acceleration cycle and a deceleration cycle.

Initial state: A terminal device supports downlink category 19 and uplink category 13, and a network device schedules the terminal device based on a maximum wireless communication capability supported by the terminal device.

Stage 1. When detecting that a chip temperature of the terminal device is greater than 110 degrees Celsius, the terminal device determines that the temperature of the terminal device is excessively high, sends adjustment information to the network device, and starts the timer T345. The adjustment information includes two downlink carriers and downlink category 12, used to indicate to adjust a quantity of downlink carriers supported by the terminal device to 2, and adjust a downlink capability level supported by the terminal device to downlink category 12.

Stage 2. After determining that the timer T345 expires, the terminal device detects and determines that the chip temperature is still greater than 110 degrees Celsius, and then reports the adjustment information again and starts the timer T345. The adjustment information includes one uplink carrier and uplink category 5, used to indicate to adjust a quantity of uplink carriers supported by the terminal device to 1, and adjust an uplink capability level supported by the terminal device to uplink category 5.

Stage 3. After determining that the timer T345 expires, the terminal device detects and determines that the chip temperature is still greater than 110 degrees Celsius, and then reports the adjustment information again and starts the timer T345. The adjustment information includes one downlink carrier and downlink category 6, used to indicate to adjust a quantity of downlink carriers supported by the terminal device to 1, and adjust a downlink capability level supported by the terminal device to downlink category 6.

Stage 4. After determining that the timer T345 expires, the terminal device detects that the chip temperature is 108 degrees Celsius. In this case, the chip temperature still falls within a high temperature range, but there is no risk, and the terminal device maintains a current state.

Stage 5. The terminal device detects that the chip temperature is lower than 100 degrees Celsius. In this case, the chip temperature resumes normal, and the acceleration process can be started. The terminal device reports the adjustment information and starts the timer T345. The adjustment information includes two downlink carriers, downlink category 12, one uplink carrier, and uplink category 5, used to indicate to adjust a quantity of downlink carriers supported by the terminal device to 2, adjust a downlink capability level supported by the terminal device to downlink category 12, adjust a quantity of uplink carriers supported by the terminal device to 1, and adjust an uplink capability level supported by the terminal device to uplink category 5.

Stage 6. After determining that the timer T345 expires, the terminal device detects that the chip temperature is lower than 100 degrees Celsius, and then reports the adjustment information again and starts the timer T345. The adjustment information includes two uplink carriers and uplink category 13, used to indicate to adjust a quantity of uplink carriers supported by the terminal device to 2, and adjust an uplink capability level supported by the terminal device to uplink category 13.

Stage 7. After determining that the timer T345 expires, the terminal device detects that the chip temperature is lower than 100 degrees Celsius, and then reports the adjustment information again. The adjustment information includes downlink category 19, used to indicate to adjust the downlink capability level supported by the terminal device to downlink category 19. In this case, because the normal capability of the terminal device has been restored, the timer T345 may no longer be started, so that once the temperature rises rapidly, the capability of the terminal device can be immediately reduced. In addition, an OverheatingAssistance IE does not include related information that is used to indicate that the terminal device is restored to the normal capability.

Embodiment 3

Embodiment 3 differs from Embodiment 2 in that a timer temporarily denoted as T346 is added as a timer for controlling the acceleration cycle. A principle of T346 is the same as that of T345. Therefore, T345 is used only to control the deceleration cycle. When the deceleration process needs to be started for overheating protection, T345 needs to be not in a running state. When the acceleration process needs to be started for temperature recovery, T346 needs to be not in a running state.

Initial state: A terminal device supports downlink category 19 and uplink category 13, and a network device schedules the terminal device based on a maximum wireless communication capability supported by the terminal device.

Stage 1. When detecting that a chip temperature of the terminal device is greater than 110 degrees Celsius, the terminal device determines that the temperature of the terminal device is excessively high, sends adjustment information to the network device, and starts the timer T345. The adjustment information includes two downlink carriers and downlink category 12, used to indicate to adjust a quantity of downlink carriers supported by the terminal device to 2, and adjust a downlink capability level supported by the terminal device to downlink category 12.

Stage 2. After determining that the timer T345 expires, the terminal device detects and determines that the chip temperature is still greater than 110 degrees Celsius, and then reports the adjustment information again and starts the timer T345. The adjustment information includes one uplink carrier and uplink category 5, used to indicate to adjust a quantity of uplink carriers supported by the terminal device to 1, and adjust an uplink capability level supported by the terminal device to uplink category 5.

Stage 3. After determining that the timer T345 expires, the terminal device detects and determines that the chip temperature is still greater than 110 degrees Celsius, and then reports the adjustment information again and starts the timer T345. The adjustment information includes one downlink carrier and downlink category 6, used to indicate to adjust a quantity of downlink carriers supported by the terminal device to 1, and adjust a downlink capability level supported by the terminal device to downlink category 6.

Stage 4. After determining that the timer T345 expires, the terminal device detects that the chip temperature is 108 degrees Celsius. In this case, the chip temperature still falls within a high temperature range, but there is no risk, and the terminal device maintains a current state.

Stage 5. The terminal device detects that the chip temperature is lower than 100 degrees Celsius. In this case, the chip temperature resumes normal, and the acceleration process can be started. The terminal device reports the adjustment information and starts the timer T346. The adjustment information includes two downlink carriers, downlink category 12, one uplink carrier, and uplink category 5, used to indicate to adjust a quantity of downlink carriers supported by the terminal device to 2, adjust a downlink capability level supported by the terminal device to downlink category 12, adjust a quantity of uplink carriers supported by the terminal device to 1, and adjust an uplink capability level supported by the terminal device to uplink category 5.

Stage 6. After determining that the timer T346 expires, the terminal device detects that the chip temperature is lower than 100 degrees Celsius, and then reports the adjustment information again and starts the timer T346. The adjustment information includes uplink category 13, used to indicate to adjust an uplink capability level supported by the terminal device to uplink category 13.

Stage 7. The terminal device detects that the chip temperature exceeds 110 degrees Celsius, and determines that overheating occurs and the deceleration process needs to be started. In this case, although T346 is running, T345 is not in a running state. Therefore, the terminal device can report the adjustment information and start the timer T345. The adjustment information includes uplink category 5, used to indicate to adjust an uplink capability level supported by the terminal device to uplink category 5.

In a subsequent process, if the chip temperature is lower than 100 degrees Celsius, the terminal device can increase the capability of the terminal device to downlink category 19 and uplink category 13. When the capability of the terminal device is restored to the normal capability, the terminal device reports UEAssistanceInformation. In addition, an OverheatingAssistance IE does not include related information that is used to indicate that the terminal device is restored to the normal capability.

Embodiment 4

In Embodiment 4, an applicable communications system may be an NR communications system, an applicable scenario is overheating protection, and one timer (such as a timer T345) is used to control an acceleration cycle and a deceleration cycle.

Initial state: A terminal device supports four downlink carriers and two uplink carriers, and supports a BWP of 100 MHz at a low frequency and a BWP of 200 MHz at a high frequency. A network device schedules the terminal device based on a maximum wireless communication capability supported by the terminal device.

Stage 1. When detecting that a chip temperature of the terminal device is greater than 110 degrees Celsius, the terminal device determines that the temperature of the terminal device is excessively high, sends adjustment information to the network device, and starts the timer T345. The adjustment information includes two downlink carriers, used to indicate to adjust a quantity of downlink carriers supported by the terminal device to 2.

Stage 2. After determining that the timer T345 expires, the terminal device detects and determines that the chip temperature is still greater than 110 degrees Celsius, and then reports the adjustment information again and starts the timer T345. The adjustment information includes one uplink carrier, used to indicate to adjust a quantity of uplink carriers supported by the terminal device to 1.

Stage 3. After determining that the timer T345 expires, the terminal device detects and determines that the chip temperature is still greater than 110 degrees Celsius, and then reports the adjustment information again and starts the timer T345. The adjustment information includes one downlink carrier, used to indicate to adjust a quantity of downlink carriers supported by the terminal device to 1.

Stage 4. After determining that the timer T345 expires, the terminal device detects and determines that the chip temperature is still greater than 110 degrees Celsius, and then reports the adjustment information again and starts the timer T345. The adjustment information includes a BWP of 20 MHz, used to indicate to adjust a value of a BWP supported by the terminal device to 20 MHz (low frequency).

Stage 5. After determining that the timer T345 expires, the terminal device detects and determines that the chip temperature is still greater than 110 degrees Celsius, but the capability of the terminal device can no longer be reduced according to a protocol. In this case, the terminal device starts to adjust a BSR weighting coefficient HotWeight, and starts the timer T345.

In an example, a specific implementation manner of adjusting the BSR weighting coefficient HotWeight may be as follows: Initially, the HotWeight is 1, and a reduction coefficient HotDown is set to 0.5. The adjusted HotWeight=HotWeight*HotDown. When the terminal device determines that a media access control (media access control, MAC) layer needs to report a buffer status BSR, a BSR value is BSR*HotWeight calculated according to a protocol rule.

Stage 6. After determining that the timer T345 expires, the terminal device detects and determines that the chip temperature is still greater than 110 degrees Celsius, and then can adjust the BSR weighting coefficient HotWeight again and start the timer T345. For a specific adjustment manner, see the example in stage 5.

It should be noted that, when the chip temperature is continuously greater than 110 degrees Celsius, the BSR weighting coefficient HotWeight can be adjusted a plurality of times, and the foregoing stage 5 and stage 6 show only two adjustment processes.

Stage 7. After determining that the timer T345 expires, the terminal device detects that the chip temperature is 108 degrees Celsius, which falls within a high temperature range, but there is no risk, and the UE maintains a current capability state.

Stage 8. The terminal device detects that the chip temperature is lower than 100 degrees Celsius. The chip temperature resumes normal, and the acceleration process can be started. Because the BSR weighting coefficient HotWeight is less than 1, the HotWeight is first adjusted and the timer T345 is started.

In an example, a specific implementation manner of adjusting the BSR weighting coefficient HotWeight may be as follows: An increase coefficient HotUp is set to 1.03. To be specific, the adjusted HotWeight=HotWeight*HotUp. When the terminal device determines that a media access control (media access control, MAC) layer needs to report a buffer status BSR, a BSR value is BSR*HotWeight calculated according to a protocol rule.

It should be noted that, when the chip temperature is less than 100 degrees Celsius, the BSR weighting coefficient HotWeight can be adjusted a plurality of times, until the BSR weighting coefficient HotWeight resumes normal. Details are not described herein.

Stage 9. After determining that the timer T345 expires, the terminal device detects that the chip temperature is lower than 100 degrees Celsius, and the HotWeight is greater than or equal to 1. In this case, the terminal device starts to increase the capability. Specifically, the terminal device reports the adjustment information and starts the timer T345. The adjustment information includes a BWP of 100 MHz, used to indicate to adjust a value of a BWP supported by the terminal device to 100 MHz (low frequency).

In a subsequent process, after determining that the timer T345 expires, the terminal device can separately increase a quantity of downlink carriers and a quantity of uplink carriers for a plurality of times. When the capability of the terminal device is restored to the normal capability (that is, the transmission rate is increased to the maximum transmission rate supported by the terminal device), the terminal device reports UEAssistanceInformation. In addition, an OverheatingAssistance IE does not include related information that is used to indicate that the terminal device is restored to the normal capability.

Embodiment 5

In Embodiment 5, an applicable communications system may be an NR communications system, an applicable scenario is power saving protection, and one timer (such as a timer T345) is used to control an acceleration cycle and a deceleration cycle.

Initial state: A terminal device reports support for capabilities of four downlink carriers and two uplink carriers, and support for a BWP of 100 MHz at a low frequency and a BWP of 200 MHz at a high frequency. A network device schedules the terminal device based on a maximum wireless communication capability supported by the terminal device. When a battery power level configured for the terminal device is less than 30%, power saving protection is started.

Stage 1. When detecting that the battery power level is less than 30%, the terminal device starts power saving protection, and reduces the capability of the UE to reduce power consumption. Specifically, the terminal device can report adjustment information and start the timer T345. The adjustment information includes one downlink carrier and one uplink carrier, used to indicate to adjust a quantity of downlink carriers supported by the terminal device to 1, and adjust a quantity of uplink carriers supported by the terminal device to 1.

Stage 2. After determining that the timer T345 expires and detecting that the battery power level is greater than 30% (or a battery of the terminal device is in a charging state), the terminal device increases its wireless communication capability to a maximum wireless communication capability supported by the terminal device. Specifically, the terminal device can report adjustment information, and the adjustment information includes four downlink carriers and two uplink carriers, used to indicate to adjust a quantity of downlink carriers supported by the terminal device to 4, and adjust a quantity of uplink carriers supported by the terminal device to 2. In this case, the timer T345 may no longer be started, and an OverheatingAssistance IE does not include related information that is used to indicate that the terminal device is restored to the normal capability.

Embodiment 6

In Embodiment 6, an applicable communications system may be an NR communications system, an applicable scenario is overload protection, and one timer (that is, a first timer) is used to control an acceleration cycle and a deceleration cycle.

Initial state: A terminal device reports support for capabilities of four downlink carriers and two uplink carriers, and support for a BWP of 100 MHz at a low frequency and a BWP of 200 MHz at a high frequency. A processor overload threshold is set to 5% idle, and a processor recovery threshold is set to 10% idle. A network device schedules the terminal device based on a maximum wireless communication capability supported by the terminal device.

Stage 1. When detecting that processor load is excessively heavy (that is, a processor margin is less than 5%), the terminal device sends adjustment information to the network device and starts a timer T345. The adjustment information includes two downlink carriers, used to indicate to adjust a quantity of downlink carriers supported by the terminal device to 2.

Stage 2. After determining that the timer T345 expires, the terminal device detects and determines that the processor load is still excessively heavy, and then reports the adjustment information again and starts the timer T345. The adjustment information includes one uplink carrier, used to indicate to adjust a quantity of uplink carriers supported by the terminal device to 1.

It should be noted that during the overload protection, if duration of the timer is set to be greater than or equal to 1s, 1s can be used as the duration of the timer, to help adjust the processor load more properly and effectively.

Stage 3. After determining that the timer T345 expires, the terminal device detects and determines that the processor load is still excessively heavy, and then reports the adjustment information again and starts the timer T345. The adjustment information includes one downlink carrier, used to indicate to adjust a quantity of downlink carriers supported by the terminal device to 1.

Stage 4 After determining that the timer T345 expires, the terminal device detects and determines that the processor load is still excessively heavy, and then reports the adjustment information again and starts the timer T345. The adjustment information includes a BWP of 20 MHz and a MIMO capability (which is specifically incapability of supporting MIMO), used to indicate to adjust a value of a BWP supported by the terminal device to 20 MHz (low frequency) and the terminal device does not support the MIMO.

Stage 5. After determining that the timer T345 expires, the terminal device detects and determines that the processor load is still excessively heavy, but the capability of the terminal device can no longer be reduced according to a protocol. In this case, the terminal device starts to adjust a BSR weighting coefficient CpuWeight, and starts the timer T345.

In an example, a specific implementation manner of adjusting the BSR weighting coefficient CpuWeight may be as follows: Initially, the CpuWeight is 1, and a reduction coefficient CpuDown can be set to 0.9. The adjusted CpuWeight=CpuWeight*CpuDown. When the terminal device determines that MAC needs to report a buffer status BSR, a BSR value is BSR*CpuWeight calculated according to a protocol rule.

Stage 6. After determining that the timer T345 expires, the terminal device detects and determines that the processor margin is 8%, which falls within a relatively high range, but there is no risk, and the terminal device may maintain a current capability state.

Stage 7. The terminal device detects that the processor margin is greater than 10%. The processor load resumes normal, and the acceleration process can be started. Because the BSR weighting coefficient CpuWeight is less than 1, the CpuWeight is first adjusted and the timer T345 is started.

In an example, a specific implementation manner of adjusting the BSR weighting coefficient CpuWeight may be as follows: An increase coefficient CpuUp is set to 1.03. To be specific, the adjusted CpuWeight=CpuWeight*CpuUp.

Stage 8. After determining that the timer T345 expires, the terminal device detects that the processor margin is greater than 10%, and the CpuWeight is greater than or equal to 1. In this case, the terminal device starts to increase the capability. Specifically, the terminal device reports the adjustment information and starts the timer T345. The adjustment information includes a MIMO capability (4*4), used to indicate that the terminal device supports MIMO 4*4.

In a subsequent process, after determining that the timer T345 expires, the terminal device can separately increase a value of a BWP, a quantity of downlink carriers, and a quantity of uplink carriers for a plurality of times. When the capability of the terminal device is restored to the normal capability (that is, the transmission rate is increased to the maximum transmission rate supported by the terminal device), the terminal device reports UEAssistanceInformation. In addition, an OverheatingAssistance IE does not include related information that is used to indicate that the terminal device is restored to the normal capability.

According to the examples described in Embodiment 2 to Embodiment 6, it should be noted that:

(1) In the embodiments of this application, when the wireless communication capability is adjusted in the deceleration process, various parameters that affect the wireless communication capability may have priorities. In an example, the priorities of various parameters may be sorted in descending order as follows: the capability levels (including the uplink capability level and the downlink capability level) supported by the terminal device, the quantities of carriers (including the quantity of uplink carriers and the quantity of downlink carriers) supported by the terminal device, the value of the BWP supported by the terminal device, the MIMO capability supported by the terminal device, and the BSR weighting coefficient of the terminal device. The acceleration process may be understood as an inverse process of the deceleration process. Therefore, when the wireless communication capability is adjusted in the acceleration process, the priorities of various parameters may be sorted in descending order as follows: the BSR weighting coefficient of the terminal device, the MIMO capability supported by the terminal device, the quantities of carriers (including the quantity of uplink carriers and the quantity of downlink carriers) supported by the terminal device, and the capability levels (including the uplink capability level and the downlink capability level) supported by the terminal device.

It should be understood that the foregoing description is merely an example. In another embodiment, the priorities of some of the various parameters may be the same. For example, the priorities of the capability levels (including the uplink capability level and the downlink capability level) supported by the terminal device and the quantities of carriers (including the quantity of uplink carriers and the quantity of downlink carriers) supported by the terminal device may be the same, which is not specifically limited.

(2) On the one hand, during overheating protection or overload protection, when the wireless communication capability is adjusted, the adjustment range is relatively small and the adjustment is performed repeatedly many times. However, during power saving protection, when the wireless communication capability is adjusted, the adjustment range can be relatively large. For example, in the deceleration process, the wireless communication capability of the terminal device can be directly reduced from the maximum wireless communication capability to the minimum wireless communication capability. Correspondingly, in the acceleration process, the wireless communication capability of the terminal device can be directly reduced from the minimum wireless communication capability to the maximum wireless communication capability. On the other hand, during overheating protection, specified time lengths of the timers used to control the deceleration process and the acceleration process may be relatively long, which may, for example, be set to a few minutes. During power saving protection, the specified time lengths of the timers used to control the deceleration process and the acceleration process may also be relatively long, or in another embodiment, no timer may be needed for power saving protection. However, during overload protection, the specified time lengths of the timers used to control the deceleration process and the acceleration process may be relatively short, which may, for example, be set to 1 s. It can be learned that, in the embodiments of this application, the adjustment ranges for adjustment in different scenarios may be different, and the duration of the timers may also be different (during specific implementation, a person skilled in the art may flexibly set the adjustment range and the duration of the timer depending on actual needs). In other words, different scenarios may correspond to different adjustment manners. For example, if the terminal device determines that the adjustment process needs to be started due to overheating, the terminal device may perform adjustment in the adjustment manner corresponding to the overheating protection. If the terminal device determines that the adjustment process needs to be started due to overload, the terminal device may perform adjustment in the adjustment manner corresponding to the overload protection. If the terminal device determines that the adjustment process needs to be started due to a battery power level, the terminal device may perform adjustment in the adjustment manner corresponding to the power saving protection.

Figure 4:
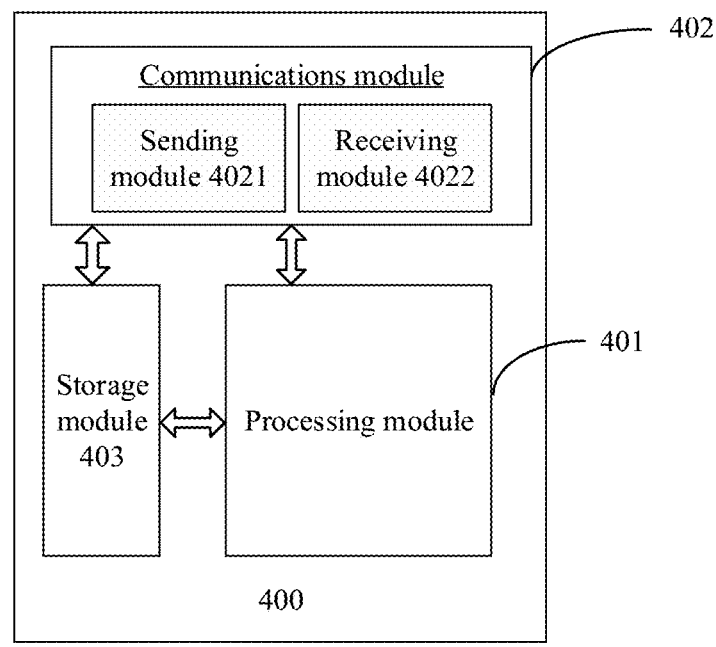
FIG. 4 is a schematic structural diagram of a wireless communications apparatus according to an embodiment of this application.

With reference to the foregoing description, FIG. 4 is a schematic structural diagram of a wireless communications apparatus according to an embodiment of this application.

As shown in FIG. 4, a wireless communications apparatus 400 includes a processing module 401, a communications module 402, a storage module 403, and the like. The processing module 401 is mainly configured to control the entire wireless communications apparatus 400, execute a software program, and process data of the software program. A module configured to implement a sending function in the communications module 402 is regarded as a sending module 4021, and a module configured to implement a receiving function in the communications module 402 is regarded as a receiving module 4022. In other words, the communications module 402 includes the sending module 4021 and the receiving module 4022. The receiving module 4022 may also be referred to as a receiver, an input interface, a receiver circuit, or the like. The sending module 4021 may be referred to as a transmitter, an emitter, an output interface, a transmitter circuit, or the like. The storage memory 403 is configured to store a software program and data.

In this embodiment of this application, the processing module 401 is configured to: when the communications module 402 uses a first wireless communication capability to communicate with a second wireless communications apparatus, if it is determined to adjust the wireless communication capability of the first wireless communications apparatus, send first adjustment information to the second wireless communications apparatus by using the communications module 402, and start a first timer, where the first adjustment information is used to indicate to adjust the wireless communication capability of the first wireless communications apparatus to a second wireless communication capability; and the communications module 402 is configured to: within a specified time of the first timer, use the second wireless communication capability to communicate with the second wireless communications apparatus, where the first wireless communication capability is any one of the plurality of wireless communication capabilities, and the second wireless communication capability is any one of the plurality of wireless communication capabilities except a maximum wireless communication capability and a minimum wireless communication capability.

In an optional implementation, the processing module 401 is further configured to: when the communications module 402 uses the second wireless communication capability to communicate with the second wireless communications apparatus, if it is determined to adjust the wireless communication capability of the first wireless communications apparatus, send second adjustment information to the second wireless communications apparatus by using the communications module 402, and start a second timer, where the second adjustment information is used to indicate to adjust the wireless communication capability of the first wireless communications apparatus to a third wireless communication capability; and the communications module 402 is further configured to: within a specified time of the second timer, use the third wireless communication capability to communicate with the second wireless communications apparatus, where the first wireless communication capability is greater than the second wireless communication capability, and the second wireless communication capability is less than the third wireless communication capability; or the first wireless communication capability is less than the second wireless communication capability, and the second wireless communication capability is greater than the third wireless communication capability.

In an optional implementation, the processing module 401 is further configured to: when the communications module 402 uses the second wireless communication capability to communicate with the second wireless communications apparatus, if it is determined to adjust the wireless communication capability of the first wireless communications apparatus, send third adjustment information to the second wireless communications apparatus by using the communications module 402, where the third adjustment information is used to indicate to adjust the wireless communication capability of the first wireless communications apparatus to a fourth wireless communication capability; and the communications module 402 is further configured to use the fourth wireless communication capability to communicate with the second wireless communications apparatus, where the fourth wireless communication capability is the maximum wireless communication capability or the minimum wireless communication capability.

The foregoing various modules may be functional modules implemented by software code, functional modules implemented by hardware circuits, or functional modules implemented by a combination of software and hardware, which is not limited in this embodiment of this application.

Figure 5:
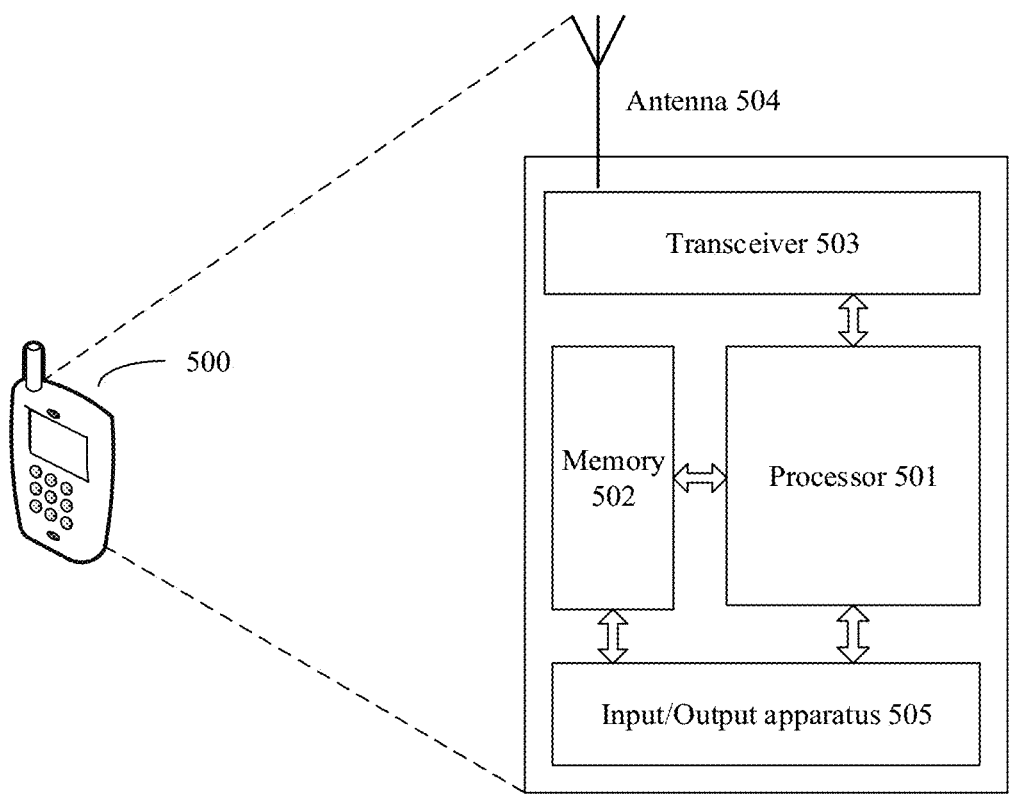
FIG. 5 is a schematic structural diagram of another wireless communications apparatus according to an embodiment of this application.

FIG. 5 is a schematic structural diagram of another wireless communications apparatus according to an embodiment of this application. The wireless communications apparatus shown in FIG. 5 may be an implementation of a hardware circuit of the wireless communications apparatus shown in FIG. 4. The wireless communications apparatus may be applicable to the flowchart shown in FIG. 2, FIG. 3a, or FIG. 3b, to perform the functions of the wireless communications apparatus in the foregoing method embodiment. For ease of description, FIG. 5 shows only main components of the wireless communications apparatus. As shown in FIG. 5, a wireless communications apparatus 500 includes a processor 501, a memory 502, a transceiver 503, an antenna 504, and an input/output apparatus 505. The processor 501 is mainly configured to: process a communications protocol and communication data, control the entire wireless communications apparatus, execute a software program, and process data of the software program. For example, the processor 501 is configured to support the wireless communications apparatus in performing the actions described in the foregoing method embodiment, for example, send a first request message to a first cell. The memory 502 is mainly configured to store a software program and data. The transceiver 503 is mainly configured to perform conversion between a baseband signal and a radio frequency signal, and process a radio frequency signal. The antenna 504 is mainly configured to receive and send a radio frequency signal in an electromagnetic wave form. The input/output apparatus 505, such as a touchscreen, a display screen, or a keyboard, is mainly configured to: receive data entered by a user and output data to the user.

After the wireless communications apparatus 500 is powered on, the processor 501 can read the software program in the memory 502 and execute the following process:

when the transceiver 503 uses a first wireless communication capability to communicate with a second wireless communications apparatus, if it is determined to adjust a wireless communication capability of a first wireless communications apparatus, the transceiver 503 sends first adjustment information to the second wireless communications apparatus and starts a first timer, where the first adjustment information is used to indicate to adjust the wireless communication capability of the first wireless communications apparatus to a second wireless communication capability. The transceiver 503 is configured to: within a specified time of the first timer, use the second wireless communication capability to communicate with the second wireless communications apparatus, where the first wireless communication capability is any one of the plurality of wireless communication capabilities, and the second wireless communication capability is any one of the plurality of wireless communication capabilities except a maximum wireless communication capability and a minimum wireless communication capability.

A person skilled in the art may understand that for ease of description, FIG. 5 shows only one memory and only one processor. Actually, the wireless communications apparatus may have a plurality of processors and a plurality of memories. The memory may also be referred to as a storage medium, a storage device, or the like. This is not limited in this embodiment of this application.

It should be understood that, the processor in the embodiments of this application may be a central processing unit (Central Processing Unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logical device, a discrete gate or a transistor logical device, a discrete hardware component, or the like. The general purpose processor may be a microprocessor, or the processor may be any conventional processor or the like.

All or some of the foregoing embodiments may be implemented by using software, hardware (for example, a circuit), firmware, or any combination thereof When software is used for implementation, all or some of the foregoing embodiments may be implemented in a form of a computer program product. The computer program product includes one or more computer instructions or computer programs. When the computer instructions or the computer programs are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, infrared, radio, and microwave, or the like) manner. The computer-readable storage medium may be any usable medium accessible by a computer, or a data storage device, such as a server or a data center that includes one or more usable media sets. The usable medium may be a magnetic medium (for example, a floppy disk, a hard disk, or a magnetic tape), an optical medium (for example, a DVD), or a semiconductor medium. The semiconductor medium may be a solid-state drive.

A person skilled in the art should understand that the embodiments of this application may be provided as a method, an apparatus (device), or a computer program product. Therefore, this application may be in a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a magnetic disk memory, a CD-ROM, an optical memory, and the like) that include computer-usable program code. The computer program is stored/distributed in a proper medium and is provided as or used as a part of the hardware together with another hardware, or may be distributed in another form, for example, through the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A wireless communication method, wherein the wireless communication method is applied to a first wireless communications apparatus, the first wireless communications apparatus is configured to have a plurality of wireless communication capabilities, and the method comprises:
    when the first wireless communications apparatus uses a first wireless communication capability to communicate with a second wireless communications apparatus, if the first wireless communications apparatus determines to adjust the first wireless communication capability, sending, by the first wireless communications apparatus, first adjustment information to the second wireless communications apparatus, and starting a first timer, wherein the first adjustment information is used to indicate to adjust the first wireless communication capability to a second wireless communication capability; and
    within a specified time of the first timer, using, by the first wireless communications apparatus, the second wireless communication capability to communicate with the second wireless communications apparatus, wherein
    the first wireless communication capability is any one of the plurality of wireless communication capabilities, and the second wireless communication capability is any one of the plurality of wireless communication capabilities except a maximum wireless communication capability and a minimum wireless communication capability;
    wherein, when the first wireless communication capability is the maximum wireless communication capability among the plurality of wireless communication capabilities, an absolute value of a difference between a first transmission rate and a second transmission rate is a first value; when the first wireless communication capability is a wireless communication capability other than the maximum wireless communication capability, the absolute value of the difference between the first transmission rate and the second transmission rate is a second value; and the first value is greater than the second value; and
    wherein the first transmission rate is an upper limit of a transmission rate at which the first wireless communications apparatus uses the first wireless communication capability to communicate with the second wireless communications apparatus, and the second transmission rate is an upper limit of a transmission rate at which the first wireless communications apparatus uses the second wireless communication capability to communicate with the second wireless communications apparatus.

2. The method according to claim 1, wherein the method further comprises:
    when the first wireless communications apparatus uses the second wireless communication capability to communicate with the second wireless communications apparatus, if the first wireless communications apparatus determines to adjust the second wireless communication capability, sending, by the first wireless communications apparatus, second adjustment information to the second wireless communications apparatus, and starting a second timer, wherein the second adjustment information is used to indicate to adjust the second wireless communication capability to a third wireless communication capability; and within a specified time of the second timer, using, by the first wireless communications apparatus, the third wireless communication capability to communicate with the second wireless communications apparatus, wherein the first wireless communication capability is greater than the second wireless communication capability, and the second wireless communication capability is less than the third wireless communication capability; or the first wireless communication capability is less than the second wireless communication capability, and the second wireless communication capability is greater than the third wireless communication capability.

3. The method according to claim 1, wherein the method further comprises:

when the first wireless communications apparatus uses the second wireless communication capability to communicate with the second wireless communications apparatus, if the first wireless communications apparatus determines to adjust the second wireless communication capability, sending, by the first wireless communications apparatus, third adjustment information to the second wireless communications apparatus, wherein the third adjustment information is used to indicate to adjust the second wireless communication capability to a fourth wireless communication capability; and using, by the first wireless communications apparatus, the fourth wireless communication capability to communicate with the second wireless communications apparatus, wherein the fourth wireless communication capability is the maximum wireless communication capability or the minimum wireless communication capability.

4. The method according to claim 1, wherein the first adjustment information comprises any one or any combination of the following:

an uplink capability level corresponding to the second wireless communication capability, used to indicate to adjust an uplink capability level supported by the first wireless communications apparatus to the uplink capability level corresponding to the second wireless communication capability;

a downlink capability level corresponding to the second wireless communication capability, used to indicate to adjust a downlink capability level supported by the first wireless communications apparatus to the downlink capability level corresponding to the second wireless communication capability;

a quantity of uplink carriers corresponding to the second wireless communication capability, used to indicate to adjust a quantity of uplink carriers supported by the first wireless communications apparatus to the quantity of uplink carriers corresponding to the second wireless communication capability;

a quantity of downlink carriers corresponding to the second wireless communication capability, used to indicate to adjust a quantity of downlink carriers supported by the first wireless communications apparatus to the quantity of downlink carriers corresponding to the second wireless communication capability;

a value of a bandwidth part (BWP) of corresponding to the second wireless communication capability, used to indicate to adjust a value of a BWP supported by the first wireless communications apparatus to the value of the BWP corresponding to the second wireless communication capability;

a multiple-input multiple-output (MIMO) capability corresponding to the second wireless communication capability, used to indicate to adjust a MIMO capability supported by the first wireless communications apparatus to the MIMO capability corresponding to the second wireless communication capability; and a buffer status report (BSR) value corresponding to the second wireless communication capability, wherein the BSR value corresponding to the second wireless communication capability is obtained by the first wireless communications apparatus based on a BSR weighting coefficient corresponding to the second wireless communication capability.

5. The method according to claim 1, wherein the determining, by the first wireless communications apparatus, to adjust the first wireless communication capability comprises:

if the first wireless communications apparatus determines that a temperature of the first wireless communications apparatus is greater than a first temperature threshold, or a battery power level is less than a first power threshold, or a processor load is greater than a first load threshold, determining, by the first wireless communications apparatus, to reduce the first wireless communication capability of the first wireless communications apparatus;

if the first wireless communications apparatus determines that a temperature of the first wireless communications apparatus is less than a second temperature threshold, a battery power level is greater than a second power threshold, and a processor load is less than a second load threshold, determining, by the first wireless communications apparatus, to increase the first wireless communication capability of the first wireless communications apparatus; or if the first wireless communications apparatus determines that a temperature of the first wireless communications apparatus is less than a second temperature threshold, a battery is in a charging state, and a processor load is less than a second load threshold, determining, by the first wireless communications apparatus, to increase the first wireless communication capability.

6. A wireless communications apparatus, wherein the wireless communications apparatus is configured to have a plurality of wireless communication capabilities, and the wireless communications apparatus comprises:

a processor and a memory, wherein the memory is configured to store a computer instruction, and when the computer instruction is run in the processor, the wireless communications apparatus is enabled to:

when the wireless communications apparatus uses a first wireless communication capability to communicate with a second wireless communications apparatus, if the wireless communications apparatus determines to adjust the first wireless communication capability, send first adjustment information to the second wireless communications apparatus, and start a first timer, wherein the first adjustment information is used to indicate to adjust the first wireless communication capability to a second wireless communication capability; and within a specified time of the first timer, use the second wireless communication capability to communicate with the second wireless communications apparatus, wherein the first wireless communication capability is any one of the plurality of wireless communication capabilities, and the second wireless communication capability is any one of the plurality of wireless communication capabilities except a maximum wireless communication capability and a minimum wireless communication capability;

wherein, when the first wireless communication capability is the maximum wireless communication capability among the plurality of wireless communication capabilities, an absolute value of a difference between a first transmission rate and a second transmission rate is a first value; when the first wireless communication capability is a wireless communication capability other than the maximum wireless communication capability, the absolute value of the difference between the first transmission rate and the second transmission rate is a second value; and the first value is greater than the second value; and wherein the first transmission rate is an upper limit of a transmission rate at which the first wireless communications apparatus uses the first wireless communication capability to communicate with the second wireless communications apparatus, and the second transmission rate is an upper limit of a transmission rate at which the first wireless communications apparatus uses the second wireless communication capability to communicate with the second wireless communications apparatus.

7. The wireless communications apparatus according to claim 6, wherein the first adjustment information comprises:
an uplink capability level corresponding to the second wireless communication capability, used to indicate to adjust an uplink capability level supported by the first wireless communications apparatus to the uplink capability level corresponding to the second wireless communication capability; or
a downlink capability level corresponding to the second wireless communication capability, used to indicate to adjust a downlink capability level supported by the first wireless communications apparatus to the downlink capability level corresponding to the second wireless communication capability.

8. The wireless communications apparatus according to claim 6, wherein the first adjustment information comprises:
a quantity of uplink carriers corresponding to the second wireless communication capability, used to indicate to adjust a quantity of uplink carriers supported by the first wireless communications apparatus to the quantity of uplink carriers corresponding to the second wireless communication capability; or
a quantity of downlink carriers corresponding to the second wireless communication capability, used to indicate to adjust a quantity of downlink carriers supported by the first wireless communications apparatus to the quantity of downlink carriers corresponding to the second wireless communication capability.

9. The wireless communications apparatus according to claim 6, wherein the first adjustment information comprises:
a value of a bandwidth part (BWP) of corresponding to the second wireless communication capability, used to indicate to adjust a value of a BWP supported by the first wireless communications apparatus to the value of the BWP corresponding to the second wireless communication capability.

10. The wireless communications apparatus according to claim 6, wherein the first adjustment information comprises:
a multiple-input multiple-output (MIMO) capability corresponding to the second wireless communication capability, used to indicate to adjust a MIMO capability supported by the first wireless communications apparatus to the MIMO capability corresponding to the second wireless communication capability.

11. The wireless communications apparatus according to claim 6, wherein the first adjustment information comprises:
a buffer status report (BSR) value corresponding to the second wireless communication capability, wherein the BSR value corresponding to the second wireless communication capability is obtained by the first wireless communications apparatus based on a BSR weighting coefficient corresponding to the second wireless communication capability.

12. The wireless communications apparatus according to claim 6, wherein:
the wireless communications apparatus is a semiconductor chip, and the semiconductor chip is to be disposed in a terminal device.

13. A non-transitory computer-readable storage medium, wherein the computer-readable storage medium stores program code, and when the program code is executed by a wireless communications apparatus, the wireless communications apparatus is enabled to:
when the wireless communications apparatus uses a first wireless communication capability to communicate with a second wireless communications apparatus, if the wireless communications apparatus determines to adjust the first wireless communication capability of the first wireless communications apparatus, send first adjustment information to the second wireless communications apparatus, and start a first timer, wherein the first adjustment information is used to indicate to adjust the first wireless communication capability to a second wireless communication capability; and within a specified time of the first timer, use the second wireless communication capability to communicate with the second wireless communications apparatus, wherein the wireless communications apparatus is configured to have a plurality of wireless communication capabilities, the first wireless communication capability is any one of the plurality of wireless communication capabilities, and the second wireless communication capability is any one of the plurality of wireless communication capabilities except a maximum wireless communication capability and a minimum wireless communication capability;

wherein, when the first wireless communication capability is the maximum wireless communication capability among the plurality of wireless communication capabilities, an absolute value of a difference between a first transmission rate and a second transmission rate is a first value; when the first wireless communication capability is a wireless communication capability other than the maximum wireless communication capability, the absolute value of the difference between the first transmission rate and the second transmission rate is a second value; and the first value is greater than the second value; and wherein the first transmission rate is an upper limit of a transmission rate at which the first wireless communications apparatus uses the first wireless communication capability to communicate with the second wireless communications apparatus, and the second transmission rate is an upper limit of a transmission rate at which the first wireless communications apparatus uses the second wireless communication capability to communicate with the second wireless communications apparatus.

14. The computer-readable storage medium according to claim 13, wherein the first adjustment information comprises:

an uplink capability level corresponding to the second wireless communication capability, used to indicate to adjust an uplink capability level supported by the first wireless communications apparatus to the uplink capability level corresponding to the second wireless communication capability; or a downlink capability level corresponding to the second wireless communication capability, used to indicate to adjust a downlink capability level supported by the first wireless communications apparatus to the downlink capability level corresponding to the second wireless communication capability.

15. The computer-readable storage medium according to claim 13, wherein the first adjustment information comprises:

a quantity of uplink carriers corresponding to the second wireless communication capability, used to indicate to adjust a quantity of uplink carriers supported by the first wireless communications apparatus to the quantity of uplink carriers corresponding to the second wireless communication capability; or a quantity of downlink carriers corresponding to the second wireless communication capability, used to indicate to adjust a quantity of downlink carriers supported by the first wireless communications apparatus to the quantity of downlink carriers corresponding to the second wireless communication capability.

16. The computer-readable storage medium according to claim 13, wherein the first adjustment information comprises:

a value of a bandwidth part (BWP) of corresponding to the second wireless communication capability, used to indicate to adjust a value of a BWP supported by the first wireless communications apparatus to the value of the BWP corresponding to the second wireless communication capability.

17. The computer-readable storage medium according to claim 13, wherein the first adjustment information comprises:

a multiple-input multiple-output (MIMO) capability corresponding to the second wireless communication capability, used to indicate to adjust a MIMO capability supported by the first wireless communications apparatus to the MIMO capability corresponding to the second wireless communication capability.

* * * * *